(12) United States Patent
Gill

(10) Patent No.: US 6,407,890 B1
(45) Date of Patent: Jun. 18, 2002

(54) DUAL SPIN VALVE SENSOR READ HEAD WITH A SPECULAR REFLECTOR FILM EMBEDDED IN EACH ANTIPARALLEL (AP) PINNED LAYER NEXT TO A SPACER LAYER

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,211

(22) Filed: Feb. 8, 2000

(51) Int. Cl.$^7$ ............................................. G11B 5/033
(52) U.S. Cl. ....................................... 360/314; 360/324
(58) Field of Search ............................... 360/314, 315, 360/316, 324, 324.1, 324.11, 324.12

(56) References Cited

U.S. PATENT DOCUMENTS

| | | | |
|---|---|---|---|
| 3,887,944 A | 6/1975 | Bajorek et al. | 360/113 |
| 5,688,380 A | 11/1997 | Koike et al. | 204/192.2 |
| 5,701,223 A | 12/1997 | Fontana, Jr. et al. | 360/113 |
| 5,742,458 A | 4/1998 | Koike et al. | 360/113 |
| 5,923,504 A | 7/1999 | Araki et al. | 360/113 |
| 6,038,107 A | * 3/2000 | Pinarbasi | 360/113 |

FOREIGN PATENT DOCUMENTS

| | | |
|---|---|---|
| DE | 19720197 | 11/1998 |
| EP | 0 871 231 A2 | 10/1998 |
| EP | 0 905 802 A2 | 3/1999 |
| JP | 410198927 A | 7/1998 |
| JP | 11-191207 | 7/1999 |

OTHER PUBLICATIONS

Saito et al., "PtMn single and dual spin valves with synthetic ferromagnetic pinned layers", *J. Appl. Phys.*, 85(8), pp. 4928–4930, Apr. 15, 1999.

* cited by examiner

*Primary Examiner*—Brian E. Miller
*Assistant Examiner*—Noel Monardes
(74) *Attorney, Agent, or Firm*—G. Marlin Knight; Ervin F. Johnston

(57) ABSTRACT

A specular reflector film of iron oxide is located between ferromagnetic first and second pinned films in a pinned layer for reflecting conduction electrons back for spin dependent scattering for improving the magnetoresistive coefficient of a spin valve sensor. The specular reflector film is preferably $\gamma Fe_2O_3$ since this material is a magnetic phase of iron oxide and will contribute to the magnetic moment of the pinned layer. In a preferred embodiment a dual spin valve sensor is employed wherein a pinned layer with a specular reflector film is located on each side of a free layer structure for reflecting conduction electrons from both sides of the free layer structure. Still further, it is preferred that each pinned layer be an antiparallel (AP) pinned layer structure with a specular reflector film embedded in one of the AP pinned layers of each AP pinned layer structure.

44 Claims, 7 Drawing Sheets

(ABS)

DUAL SPIN VALVE SENSOR READ HEAD WITH A SPECULAR REFLECTOR FILM EMBEDDED IN EACH ANTIPARALLEL (AP) PINNED LAYER NEXT TO A SPACER LAYER

BACKGROUND OF THE INVENTION

1. Field of the Invention

The present invention relates to a dual spin valve sensor read head with a specular reflector film embedded in each antiparallel (AP) pinned layer next to a spacer layer and, more particularly, to such a dual spin valve sensor wherein the reflector films of the AP pinned layers reflect conduction electrons back into mean free paths of conduction electrons for increasing the magnetoresistive coefficient of the spin valve sensor.

2. Description of the Related Art

A spin valve sensor is employed by a read head for sensing magnetic fields on a moving magnetic medium, such as a rotating magnetic disk. A typical sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) which is an exposed surface of the sensor that faces the magnetic medium. First and second leads are connected to the spin valve sensor. for conducting a sense current therethrough. A magnetic moment of the free layer is free to rotate in positive and negative directions from a quiescent or bias point position in response to positive and negative magnetic field signals from a rotating magnetic disk. The quiescent position, which is typically parallel to the ABS is the position of the magnetic moment of the free layer-with the sense current conducted through the sensor in the absence of signal fields. If the quiescent position of the magnetic moment is not parallel to the ABS in the absence of a signal field the positive and negative responses of the free layer to positive and negative signal fields will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with respect to the pinned and free layers. When the magnetic moments of the pinned and free layers are parallel with respect to one another scattering is at a minimum and when their magnetic moments are antiparallel scattering is maximized. Changes in scattering in response to signal fields from a rotating disk changes the resistance of the spin valve sensor as a function of $\cos \theta$, where $\theta$ is the angle between the magnetic moments of the pinned and free layers. The sensitivity of the sensor is quantified as magnetoresistive coefficient dr/R where dr is the change in resistance of the sensor between parallel and antiparallel orientations of the pinned and free layers and R is the resistance of the sensor when the moments are parallel.

The transfer curve (readback signal of the spin valve head versus applied signal from the magnetic disk) of a spin valve sensor is a substantially linear portion of the aforementioned function of $\cos \theta$. The greater this angle, the greater the resistance of the spin valve to the sense current and the greater the readback, signal (voltage sensed by processing circuitry). With positive and negative signal fields from a, rotating magnetic disk (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the free layer is parallel to the ABS, and the direction of the magnetic moment of the pinned layer is perpendicular to the ABS in a quiescent state (absence of signal fields) the bias point is located at zero and the positive and negative readback signals will be equal when sensing positive and negative signal fields from the magnetic disk. The readback signals are then referred to in the art as having symmetry about the zero bias, point. When the readback signals are not equal the readback signals are asymmetric which equates to reduced storage capacity.

The location of the bias point on the transfer curve is influenced by three major forces on the free layer, namely a demagnetization field ($H_D$) from the pinned layer, a ferromagnetic coupling field ($H_F$) between the pinned layer and the free layer, and sense current fields ($H_I$) from all conductive layers of the spin valve except the free layer. When the sense current is conducted through the spin valve sensor, the pinning layer (if conductive), the pinned layer and the first spacer layer, which are all on one side of the free layer, impose sense current fields on the free layer that rotate the magnetic moment of the free layer in a first direction. The ferromagnetic coupling field from the pinned layer further rotates the magnetic moment of the free layer in the first direction. The demagnetization field from the pinned layer on the free layer rotates the magnetic moment of the free layer in a direction opposite to the first direction. Accordingly, the demagnetization field opposes the sense current and ferromagnetic coupling fields and can be used for counterbalancing.

In some spin valve sensors an antiparallel (AP) pinned layer structure is substituted for the typical single layer pinned layer. The AP pinned layer structure includes a nonmagnetic AP coupling layer between first and second AP pinned layers. The first AP pinned layer is exchange coupled to the antiferromagnetic pinning layer which pins the magnetic moment of the first AP pinned layer in the same direction as the magnetic spins of the pinning layer. By exchange coupling between the first and second AP pinned layers the magnetic moment of the second AP pinned layer is pinned antiparallel to the magnetic moment of the first AP pinned layer. An advantage of the AP pinned layer structure is that demagnetization fields of the first and second AP pinned layers partially counterbalance one another so that a small demagnetization field is exerted on the free layer for improved biasing of the free layer. Further, the first AP pinned layer can be thinner-than the single pinned layer which increases an exchange coupling field between the pinning layer and the first AP pinned layer. The AP pinned layer structure is described in U.S. Pat. No. 5,465,185 which is incorporated by reference herein.

Over the years a significant amount of research has been conducted to improve symmetry of the read signals, the magnetoresistive coefficient dr/R and the read gap. The read gap, which is the distance between the first and second shield layers, should be minimized to increase the linear bit reading density of the read head. These efforts have increased the storage capacity of computers from kilobytes to megabytes to gigabytes.

SUMMARY OF THE INVENTION

I have found that by embedding a thin iron oxide (FeO) film within a ferromagnetic pinning layer that conduction electrons being lost by diffusive scattering will be reflected back for spin dependent scattering thereby increasing the magnetoresistive coefficient dr/R of the spin valve sensor. In the pinned layer structure the iron oxide (FeO) film, which is 5 Å to 15 Å thick, is preferably located between first and second AP pinned films of cobalt iron (CoFe). The specular reflector film of iron oxide (FeO) is exchange coupled to each of the first and second AP pinned films. If the specular reflector film is too thick the specular reflector film pins the magnetic moments of the first and second AP pinned films by coercivity. When the AP pinned films are pinned by coercivity this makes the free layer structure less sensitive to rotation in response to signal fields from the rotating magnetic disk which equates to reduced sensitivity of the read head. Accordingly, the specular reflector film of iron oxide (FeO) must be thin.

The pinned layer may be a single multi-film pinned layer for a single pinned spin valve sensor or preferably an AP pinned layer next to a spacer layer of an AP pinned structure. While the spin valve sensor may be a single spin valve sensor with only one pinned layer with a specular reflector film it is preferred that a dual spin valve sensor is employed wherein AP pinned structures are located on opposite sides of the free layer structure with each AP pinned layer structure having an AP pinned layer with a specular reflector film. If the spin valve sensor is a single spin valve sensor it should be understood that it can be a top or a bottom spin valve sensor wherein a top spin valve sensor is where the pinning layer is located at the top of the sensor close to the second read gap layer and wherein the bottom spin valve sensor is where the pinning layer is located at the bottom of the sensor close to the first read gap layer.

The preferred iron oxide (FeO) is $\gamma Fe_2O_3$ which is a magnetic phase of iron oxide and will therefore contribute to the magnetic moment of the pinned layer. Another iron oxide is $\alpha Fe_2O_3$ which is a nonmagnetic phase of iron oxide. Accordingly, $\alpha Fe_2O_3$ will not contribute to the magnetic moment of the pinned layer. Optionally, the specular reflector film can be FeO or $Fe_3O_4$. In the AP pinned structure the first and second AP pinned films are exchange coupled to the iron oxide (FeO) specular reflector film. In contrast to typical exchange coupled films the coupling between the AP pinned and specular reflector films is substantially not unidirectional and characteristically manifests increased coercivity.

An object of the present invention is to provide a spin valve sensor which has an improved magnetoresistive coefficient dr/R.

Another object is to provide a dual spin valve sensor that returns conduction electrons to a free layer structure from both sides of the free layer structure by specular reflection.

Other objects and attendant advantages of the invention will be appreciated upon reading the following description taken together with the accompanying drawings.

DESCRIPTION OF THE PREFERRED EMBODIMENTS MAGNETIC DISK DRIVE

Figure 1:
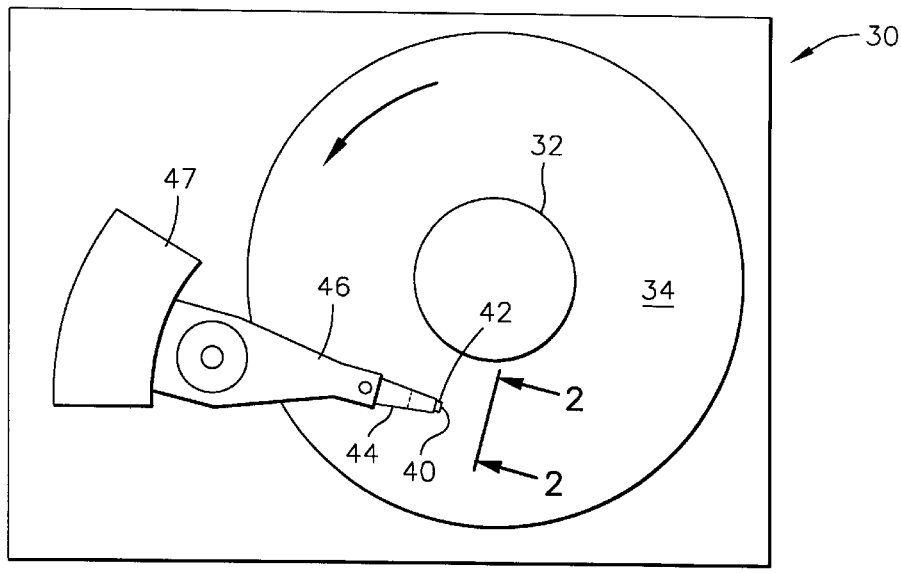
FIG. 1 is a plan view of an exemplary magnetic disk drive.
Figure 2:
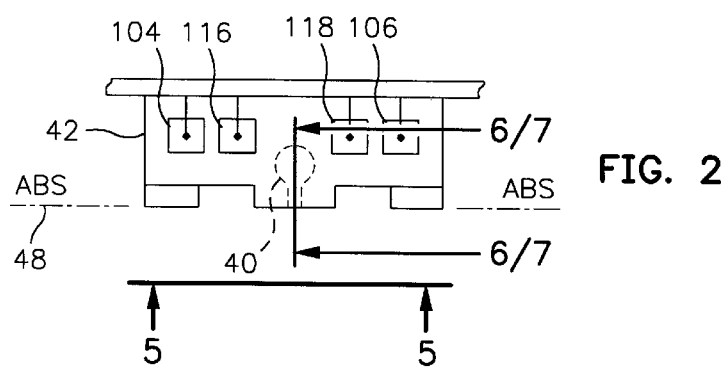
FIG. 2 is an end view of a slider with a magnetic head of the disk drive as seen in plane 2—2.
Figure 3:
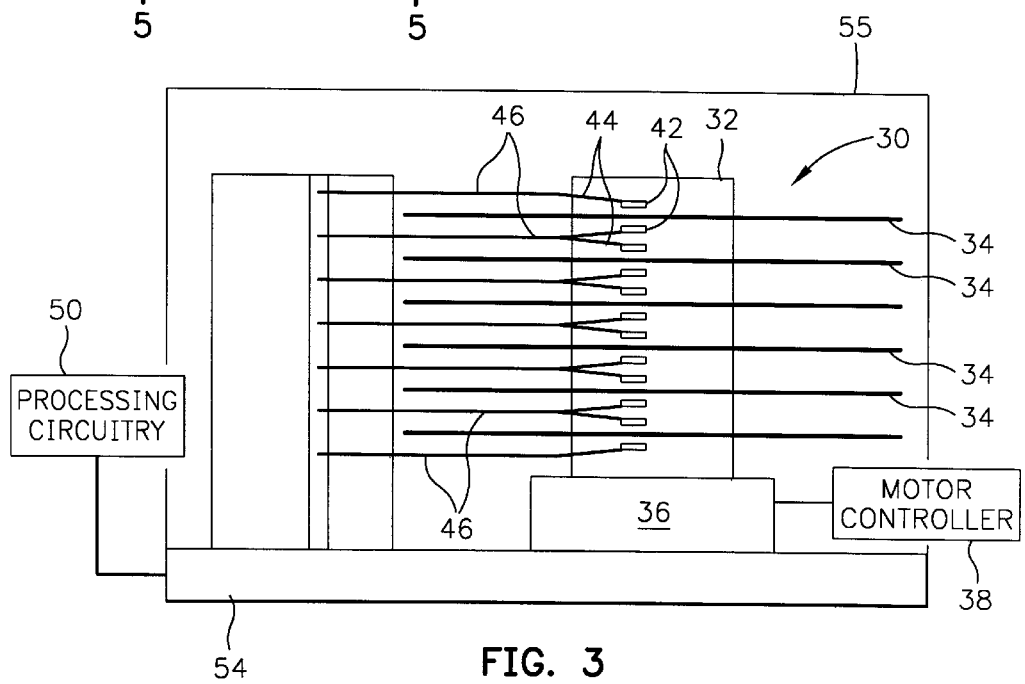
FIG. 3 is an elevation view of the magnetic disk drive wherein multiple disks and magnetic heads are employed.
Figure 4:
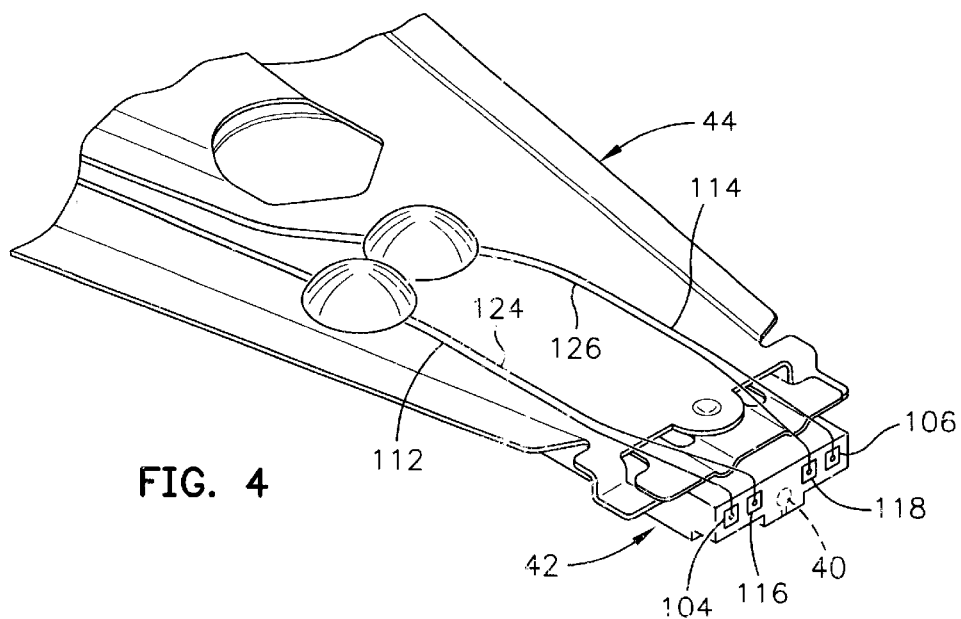
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 which is rotatably positioned by an actuator 47. A plurality of disks, sliders and suspensions may be employed in a large capacity direct access storage device (DASD) as shown in FIG. 3. The actuator 47 moves the actuator arm 46 and the suspension 44 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
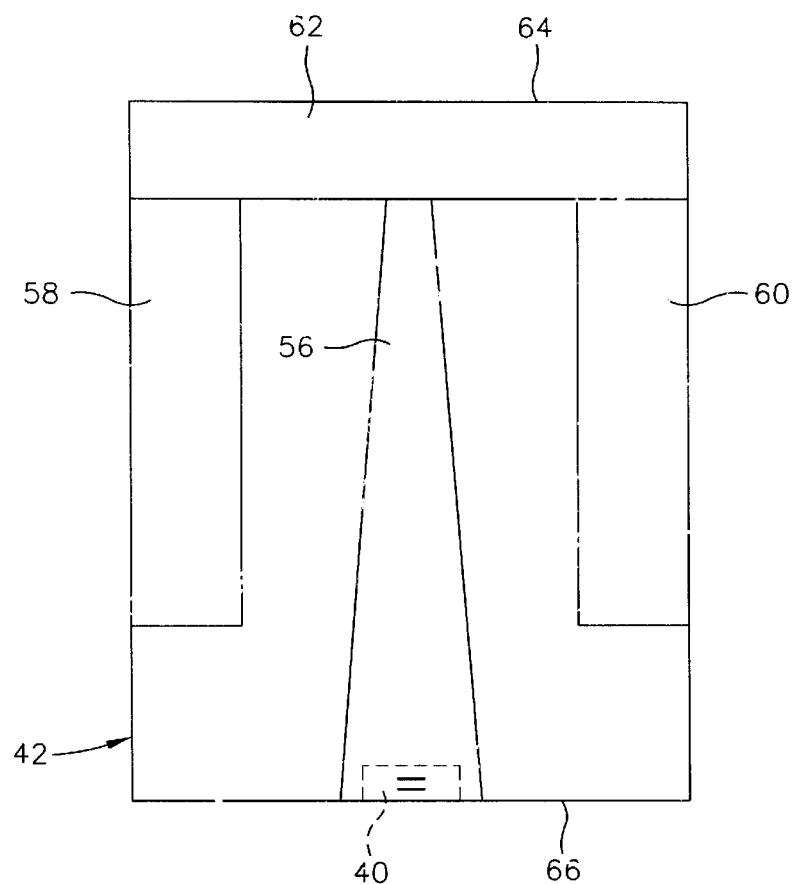
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
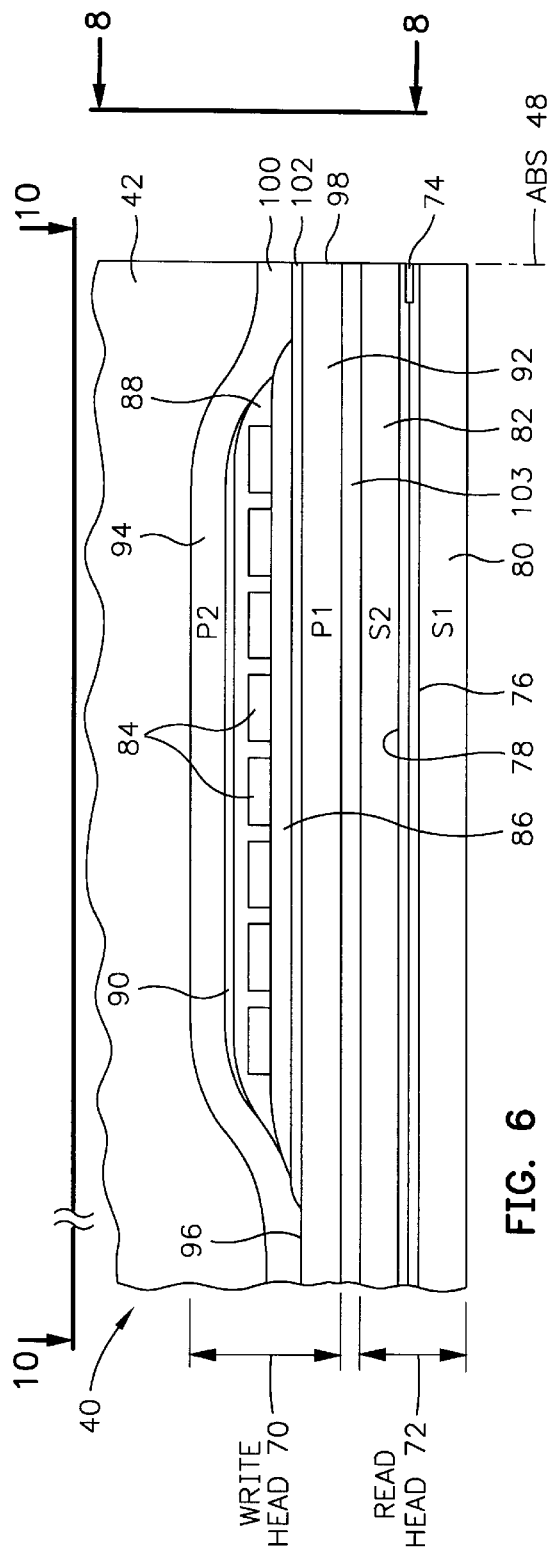
FIG. 6 is a partial view of the slider and a piggyback magnetic head as seen in plane 6—6 of FIG. 2.
Figure 8:
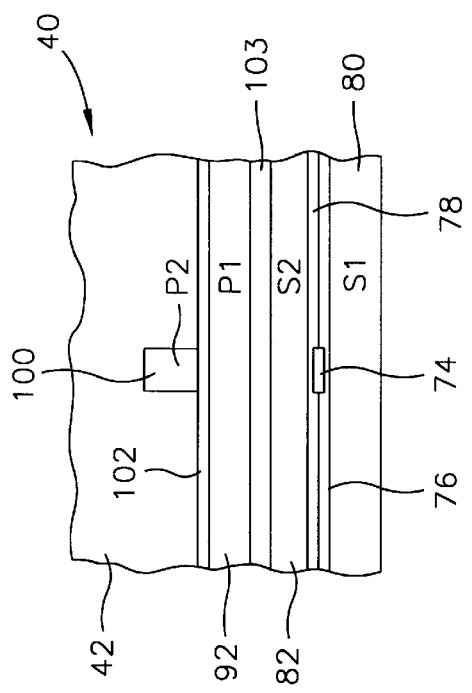
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
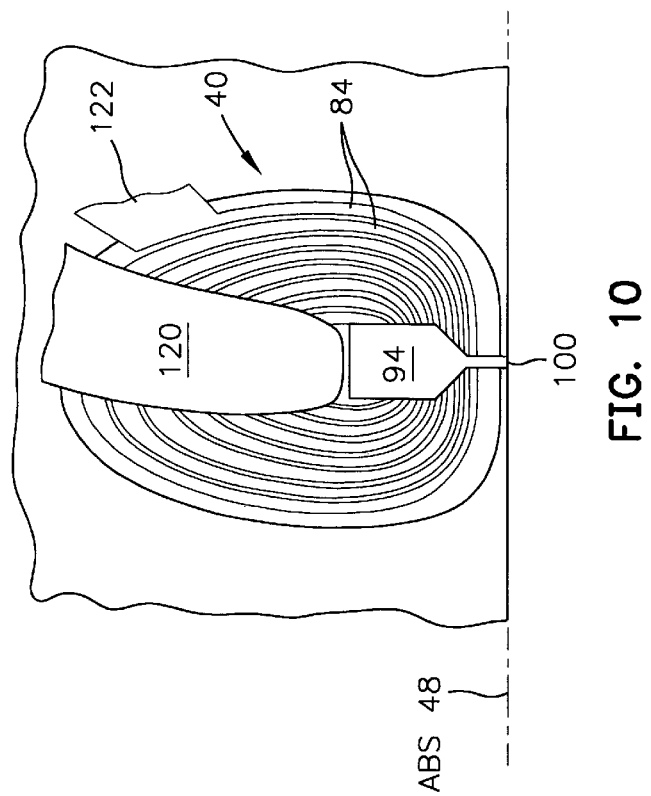
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between yoke portions of first and second pole piece layers 92 and 94. The first and second pole piece layers 92 and 94 are magnetically coupled at a back gap 96 and have first and second pole tips 98 and 100 which are separated by a write gap layer 102 at the ABS. A nonmagnetic isolation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
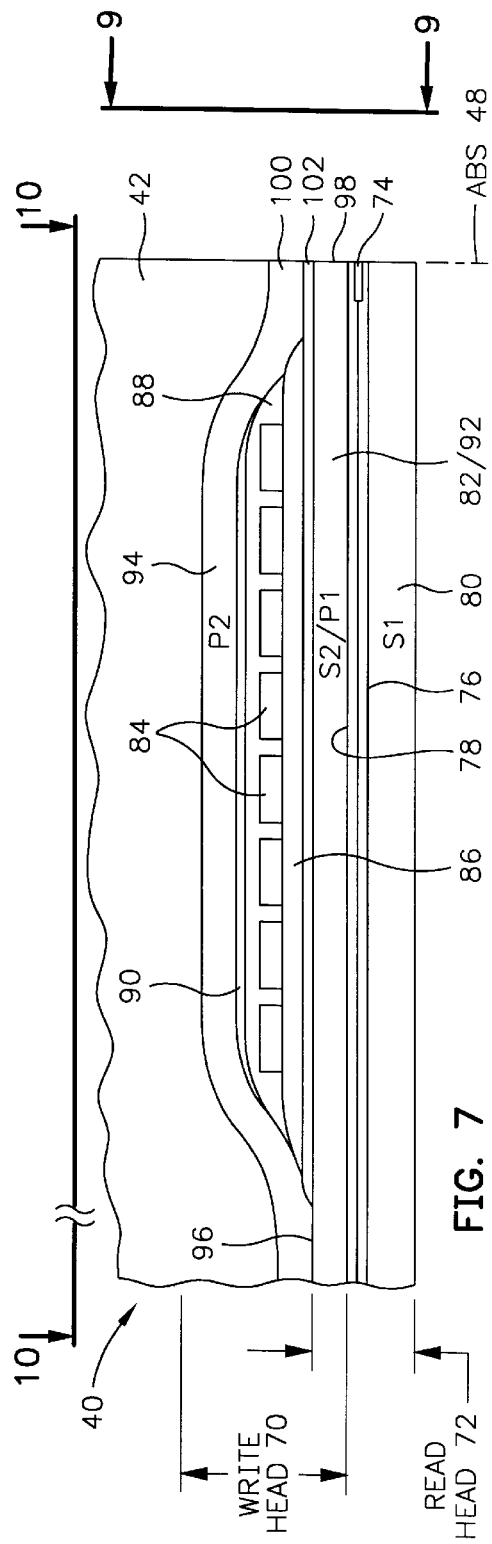
FIG. 7 is a partial view of the slider and a merged magnetic head as seen in plane 7—7 of FIG. 2.
Figure 9:
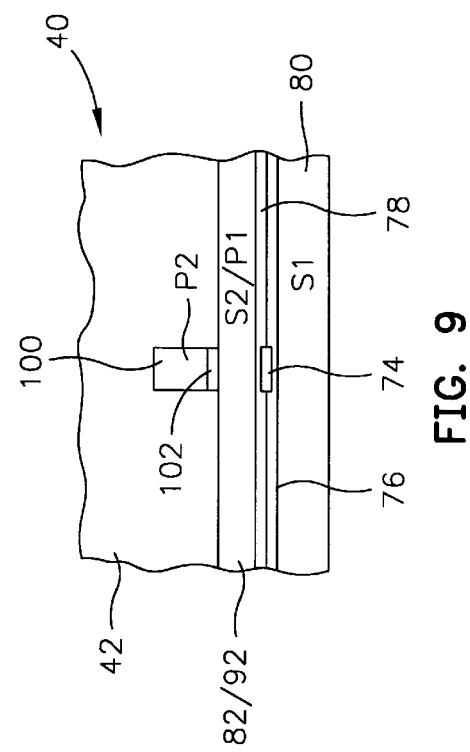
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
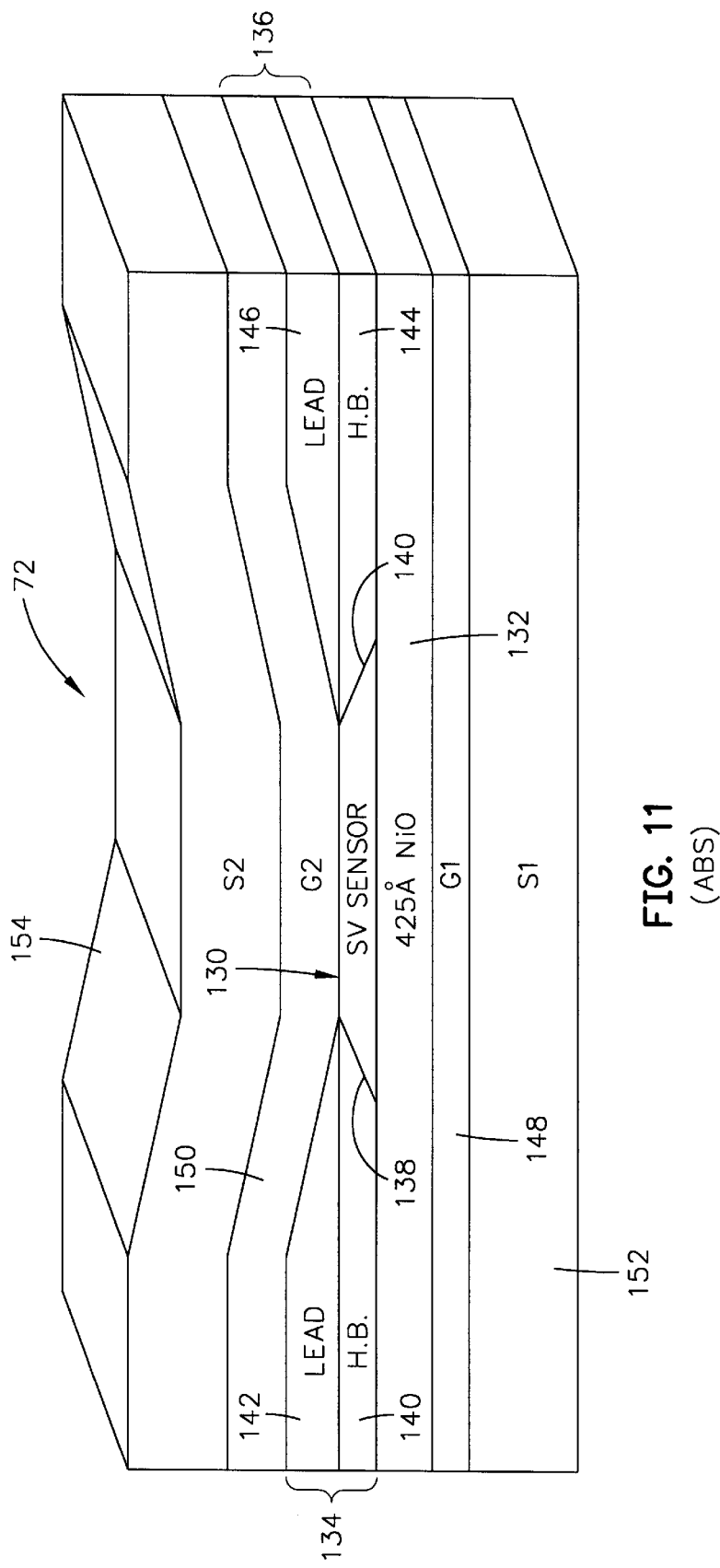
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. The spin valve sensor 130 has a pinned layer structure, to be described hereinafter, which has a magnetic moment that is pinned by an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
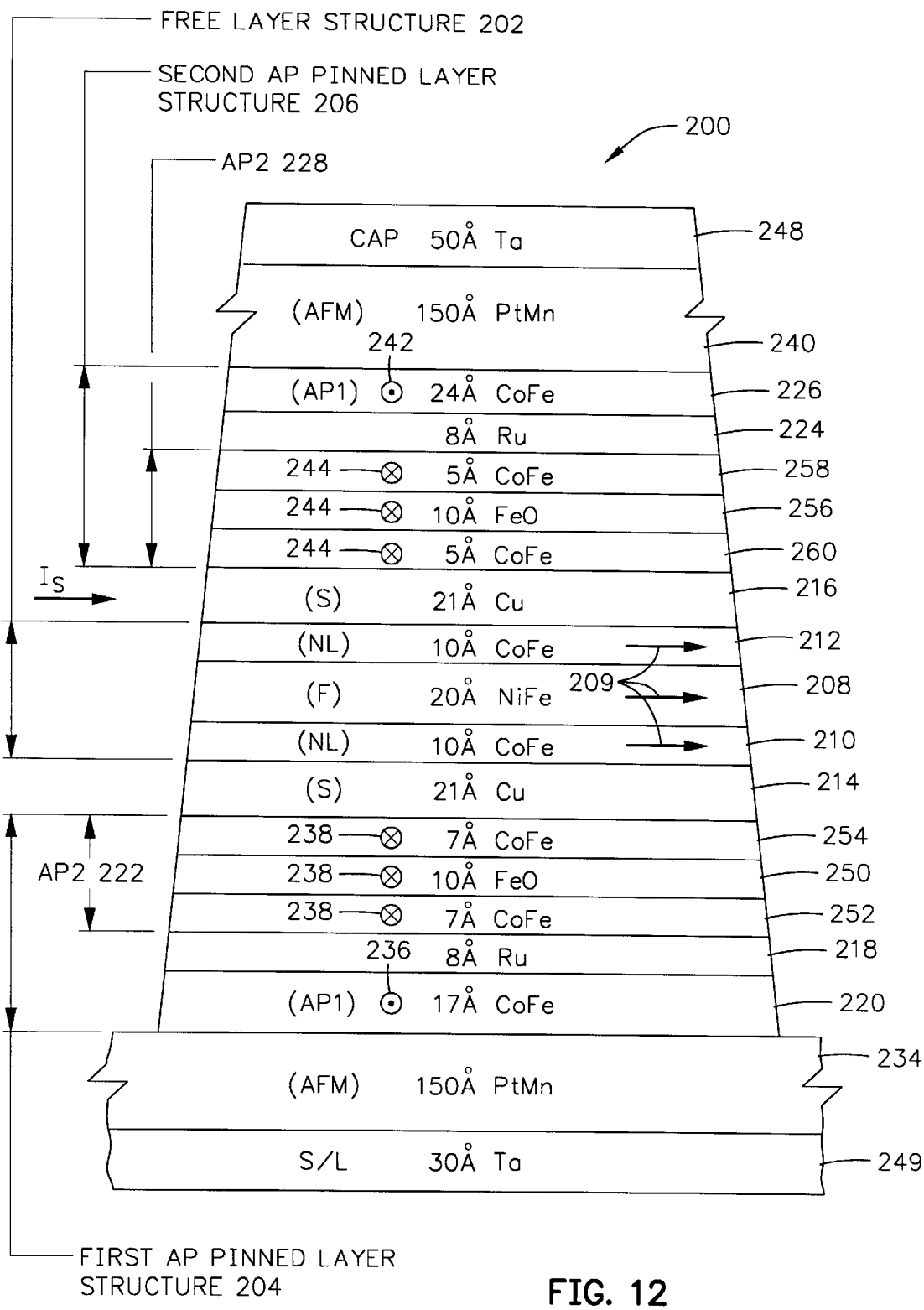
FIG. 12 is an ABS illustration of the present spin valve sensor.

FIG. 12 illustrates the present spin valve sensor 200 which has a free layer structure 202 which is located between first and second AP pinned layer structures 204 and 206. In a preferred embodiment the free layer structure 202 has a nickel iron (NiFe) free layer (F) 208 which is located between first and second cobalt (Co) based nanolayers (NL) 210 and 212. The free layer structure 202 has a magnetic moment 209 which is substantially parallel to the ABS, either from right to left, or from left to right as shown in FIG. 12. A first spacer layer (S) 214 is located between the first AP pinned layer structure 204 and the free layer structure 202 and a second spacer layer(S) 216 is located between the second AP pinned layer structure 206 and the free layer structure.

The first AP pinned layer structure 204 includes an antiparallel coupling layer 218 which is located between first and second AP pinned layers (AP1) and (AP2) 220 and 222. The second AP pinned layer structure 206 includes a first AP coupling layer 224 which is located between first and second AP pinned layers (AP1) and (AP2) 226 and 228. A first antiferromagnetic (AFM) pinning layer 234 is exchange coupled to the first AP pinned layer 220 which may set a magnetic moment 236 of the first AP pinned layer perpendicular to the ABS and away from the sensor as shown in FIG. 12. By antiparallel coupling between the first and second AP pinned layers 220 and 222 a magnetic moment 238 of the second AP pinned layer is oriented antiparallel to the magnetic moment 236. A second antiferromagnetic (AFM) pinning layer 240 is exchange coupled to the first AP pinned layer 226 which may pin a magnetic moment 242 of the first AP pinned layer perpendicular to the ABS and away from the sensor as shown in FIG. 12. By antiparallel coupling between the first and second AP pinned layers 226 and 228 a magnetic moment 244 of the second AP pinned layer 228 is oriented antiparallel to the magnetic moment 242. A cap layer 248 is located on the pinning layer 240 for protecting the pinning layer from subsequent processing steps and a seed layer 249, which is 30 Å of tantalum (Ta) is located below the pinning layer 234 for increasing the performance of the pinning layer when the pinning layer is platinum manganese (PtMn) as shown in FIG. 12. The platinum manganese (PtMn) pinning layers 234 and 240 will cause negative ferromagnetic coupling fields $H_F$ to be exerted on the free layer structure 206 which will be discussed in more detail hereinafter.

With the above arrangement the orientations of the magnetic moments 238 and 244 are parallel with respect to one another which means they are in phase. This is required for the spin valve effect on each side of the free layer structure 202 to be additive. If a signal field causes the magnetic moment 209 of the free layer structure to rotate upwardly the resistance of the spin valve sensor will decrease in the sense current circuit which conducts the sense current $I_s$ and if a signal field causes the magnetic moment 209 to rotate downwardly the resistance will increase in the sense current circuit. These increases and decreases in the resistance of the spin valve sensor in response to signal fields are manifested as potential changes in the sense current circuit which can be processed by the processing circuitry 50 in FIG. 3 as playback signals.

The present invention provides specular reflection of conduction electrons back into mean free paths of conduction electrons which are located in the spacer layers 214 and 216 between the free layer structure 206 and the second AP pinned layers 222 and 228. Each of the second AP pinned layers 222 and 228 is provided with a specular reflection capability. This is first accomplished by providing the second AP pinned layer 222 with a specular reflector film of iron oxide 250 which is located between ferromagnetic first and second pinned films 252 and 254. Each of the first and second pinned films 252 and 254 may be 7 Å of cobalt iron (CoFe) and the specular reflector film 250 may be 10 Å of iron oxide (FeO). The specular reflector film 250 reflects conduction electrons toward the free layer structure 202. The second AP pinned layer 228 includes a specular reflector film 256 which is located between ferromagnetic first and second pinned films 258 and 260. The specular reflector film 256 may be 10 Å0 of iron oxide (FeO) and the first and second pinned films 258 and 260 may be 5 Å of cobalt iron (CoFe). Each of the specular reflector films 250 and 256 should be thin layers of iron oxide (FeO), which thicknesses preferably fall within a range from 5 Å to 15 Å.

The preferred material for each of the specular reflector films 250 and 256 is $\gamma Fe_2O_3$ which is a magnetic phase of iron oxide and contributes to the magnetic moments 238 and 244 of the second AP pinned layers 222 and 228. Optionally, the material of the specular reflector films 250 and 256 may be $\alpha Fe_2O_3$ which is a nonmagnetic phase of iron oxide. Since $\alpha Fe_2O_3$ does not contribute to the magnetic moment the magnetic moments 238 and 244 shown for the specular reflector films 250 and 256 would be nonexistent. Optionally, the material for the specular reflector films 250 and 256 may be $Fe_3O_4$ or FeO. It should be understood that the thickness of the specular reflector films 250 and 256 will vary depending upon whether it is a magnetic phase or a nonmagnetic phase of iron oxide. $\gamma Fe_2O_3$ has a magnetic moment which is 0.8 times that of nickel iron ($Ni_{80}Fe_{20}$) whereas cobalt iron ($Co_{90}Fe_{10}$) has a magnetic moment of 1.7 times that of nickel iron ($Ni_{80}Fe_{20}$).

In the embodiment shown in FIG. 12 the magnetic moment of the first AP pinned layer 220 is equal to the magnetic moment of the second AP pinned layer 228 and the magnetic moment of the second AP pinned layer 222 is equal to the magnetic moment of the first AP pinned layer 226. Further, the second AP pinned layer 222 and the first AP pinned layer 226 have magnetic moments which are greater than the first AP pinned layer 220 and the second AP pinned layer 228. This enables the spin valve sensor 200 to be file resettable which will be discussed in more detail hereinbelow.

The second AP pinned layer 222 exerts a negative ferromagnetic coupling field $H_F$ on the free layer structure 202, which is perpendicular to the ABS and, away from the sensor, and the second AP pinned layer 228 exerts a negative ferromagnetic coupling field $H_F$ on the free layer structure 202 which is also perpendicular to the ABS and away from the sensor. Accordingly, the ferromagnetic coupling fields are additive and tend to rotate the magnetic moment 209 of the free layer downwardly from the sensor which affects the bias point of the free layer. The ferromagnetic coupling fields may be counterbalanced by a net demagnetization field $H_D$ of the first and second AP pinned structures 204 and 206 exerted on the free layer structure 202 and by net sense current fields exerted on the free layer structure by the metallic layers on each side of the free layer structure. In the embodiment shown in FIG. 12 the net demagnetizing field on the free layer structure 202 is perpendicular to the ABS and into the sensor due to the larger thickness of the first AP pinned layer 226. This tends to rotate the magnetic moment 209 of the free layer structure 202 upwardly into the sensor. The sense current $I_s$ causes sense current fields (not shown) from the conductive layers below the free layer structure 202 to be exerted on the free layer structure in a direction perpendicular to the ABS and away from the sensor while the sense current fields from the conductive layers above the free layer structure are exerted on the free layer structure perpendicular to the ABS and into the sensor. Since the second AP pinned layer structure 206 is thicker than the first AP pinned layer structure 204 there is a net sense current field $H_I$ on the free layer structure 202 that is perpendicular to the ABS and into the sensor. Accordingly, the ferromagnetic coupling field $H_F$ can be counterbalanced by the net demagnetization field $H_D$ and the net sense current field $H_I$. Alternatively, the thicknesses of the AP pinned layers in the first and second AP pinned layer structures 204 and 206 can be adjusted so as to provide a net demagnetization field which is in an opposite direction to the ferromagnetic coupling field so that the sense current field $H_I$ counterbalances the net demagnetizing field $H_D$ and the ferromagnetic coupling field $H_F$.

The spin valve sensor 200 can be reset by conducting a voltage pulse through the spin valve sensor from the sense voltage circuit. If the spin valve sensor 200 is in a magnetic disk drive, as shown in FIG. 3, the processing circuitry 50 may be utilized for providing the voltage pulse to the spin valve sensor 200 via the sense voltage circuit which includes the first and second hard bias and lead layers 134 and 136 in FIG. 11. If the spin valve sensor 200 is at the wafer or row level in the construction of multiple magnetic heads the sensor may be reset by employing a current pulse generator to apply a voltage pulse to the terminals 104 and 106 shown in FIG. 2. It is necessary that the voltage pulse raise the temperature of the first and second antiferromagnetic layers 234 and 240 at or near their blocking temperature. In the preferred embodiment the first and second antiferromagnetic layers 234 and 240 are platinum manganese (PtMn) which has a blocking temperature of about 240° C. A typical sense voltage $V_S$ is about 0.3 volts. I found that when the voltage pulse is about 1 volt, which is approximately three times the sense voltage Vs, for about 100 ns the temperature of the pinning layers 234 and 240 is sufficiently elevated so that the current fields caused by a current pulse through the conductive layers of the spin valve sensor orient the magnetic moment 238 of the first AP pinned layer perpendicular to the ABS and into the sensor and the magnetic moment 242 of the first AP pinned layer to be directed perpendicular to the ABS and away from the sensor. When the voltage pulse is terminated and the sensor cools the magnetic spins of the pinning layers 234 and 248 pin the magnetic moments 236 and 242 of the first AP pinned layers 220 and 226 in the directions shown in FIG. 12.

In the preferred embodiment the blocking temperature of the first and second pinning layers 234 and 248 is below 280° C. Materials with blocking temperatures below 280° C. are platinum manganese (PtMn) with a blocking temperature of 240° C., iridium manganese (IrMn) with a blocking temperature between 250° C. to 260° C., nickel oxide (NiO) with a blocking temperature between 215° C. to 225° C. and iron manganese (FeMn) with a blocking temperature of approximately 180° C. Of these materials platinum manganese (PtMn) is preferred because of its low blocking temperature. Further, platinum manganese (PtMn) is not corrosive at its edge which interfaces the ABS.

Exemplary thicknesses for the layers are 150 Å platinum manganese (PtMn) for the first pinning layer 234, 17 Å of cobalt iron (CoFe) for the first AP pinned layer 220, 8 Å of ruthenium (Ru) for the AP coupling layer 218, 7 Å of cobalt iron (CoFe) for the first AP film 252, 10 Å of iron oxide (FeO) for the specular reflector film 250, 7 Å of cobalt iron (CoFe) for the second AP film 254, 21 Å of copper (Cu) for each of the first and second spacer layers 214 and 216, 10 Å of cobalt iron (CoFe) for the first and second nanolayers 210 and 212, 20 Å of nickel iron (NiFe) for the free layer structure 208, 5 Å of cobalt iron (CoFe) for the first AP film 258, 10 Å of iron oxide (FeO) for the specular reflector layer 256, 7 Å of cobalt iron (CoFe) for the second AP film 200, 8 Å of ruthenium (Ru) for the AP coupling layer 224, 24 Å of cobalt (Co) or cobalt iron (CoFe) for the first AP pinned layer 226, 150 Å of platinum manganese (PtMn) for the second pinning layer 240 and 30 Å of tantalum (Ta) for the cap layer 248. It should be understood that cobalt (Co) or a cobalt alloy may be substituted for the cobalt iron (CoFe)

layers in FIG. 12. It should further be noted that the cobalt based nanolayers 210 and 212 on each side of the free layer 208 and- which are part of the free layer structure 206 are instrumental in promoting the magnetoresistive coefficient dr/R in contrast to the nickel iron (NiFe) free layer 208 interfacing the first and second spacer layers 214 and 216.

Figure 13:
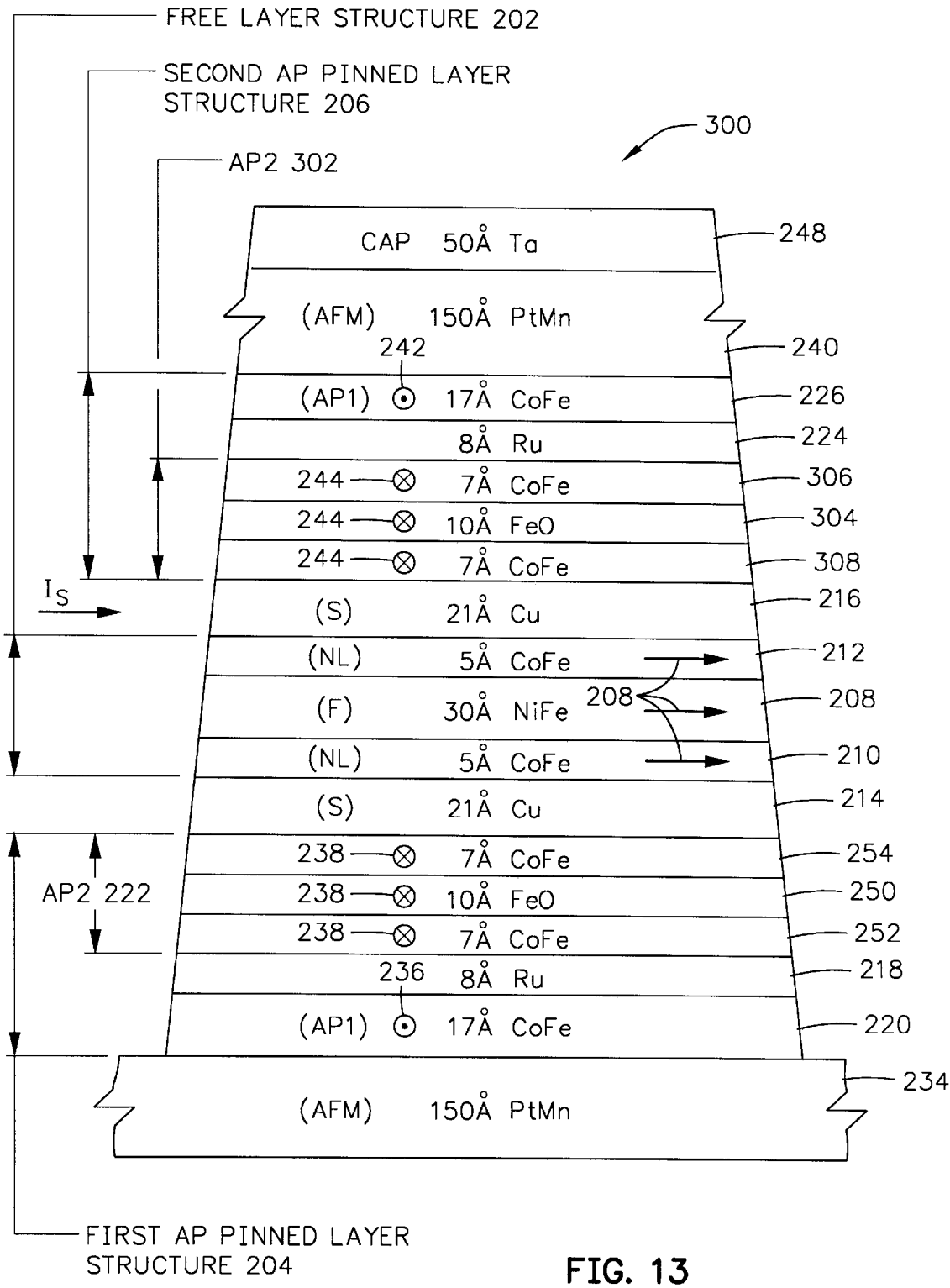
FIG. 13 is an ABS-illustration of another embodiment of the present spin valve sensor.

Another embodiment of the dual spin valve sensor 300 is shown in FIG. 13. This sensor is the same as the dual spin valve sensor 200 shown in FIG. 12 except for the second AP pinned layer 302 which has an iron oxide specular reflector film 304 which is located between ferromagnetic first and second pinned films 306 and 308. Exemplary thicknesses and materials for the layers are 10 Å of $\gamma Fe_2O_3$ for the specular reflector film 304 and 7 Å of cobalt iron (CoFe) for each of the first and second pinned films 306 and 308. In this embodiment the magnetic thickness or moment of the first AP pinned layer 220 is equal to the magnetic thickness or moment of the first AP pinned layer 226 and the magnetic thickness or moment of the second AP pinned layer 222 is equal to the magnetic thickness or moment of the second AP pinned layer 302. Further, the second AP pinned layers 222 and 302 are magnetically thicker than the first AP pinned layers 220 and 226. With this relationship the spin valve sensor 300 in FIG. 13 is not file resettable like the spin valve sensor 200 in FIG. 12. The magnetic spins of the first and second pinning layers 234 and 248 are set by applying heat of about 230° C. in the presence of a magnetic field of approximately 12 kOe for about 10 minutes from a location exterior the sensor perpendicular to the ABS in a direction into the head which causes the magnetic moments 238 and 244 to be directed into the head because they are magnetically thicker and the magnetic moments 236 and 242 to be antiparallel to the magnetic moments 238 and 244 as shown. When the applied field is relaxed and the sensor cools from its high temperature the magnetic spins of the first and second pinning layers 234 and 240 are set for pinning the magnetic moments 236, 238, 244 and 242 as shown in FIG. 13. The same method explained for balancing the magnetic fields on the free layer structure 202 for the embodiment 200 shown in FIG. 12 may also be used for balancing the magnetic fields exerted on the free layer structure 202 for the embodiment 300 in FIG. 13. It should be understood, however, that if the pinning layers 234 and 240 in either of the embodiments 200 or 300 is a metal other than platinum manganese (PtMn), such as iridium manganese (IrMn), nickel manganese (NiMn), chromium platinum manganese (CrPtMn) or palladium platinum manganese (PdPtMn) that the ferromagnetic coupling field exerted on the free layer structure 202 by the pinned layers closest thereto may be positive instead of negative. When the ferromagnetic coupling field is positive this means that the ferromagnetic coupling field is in the same direction as the magnetic moment of the respective pinned layer. Accordingly, when the ferromagnetic coupling field is positive this must be taken into consideration when counterbalancing the other magnetic fields on the free layer structure 202.

Clearly, other embodiments and modifications of this invention will occur readily to those of ordinary skill in the art in view of these teachings. Therefore, this invention is to be limited only by the following claims, which include; all such embodiments and modifications when viewed in conjunction with the above specification and accompanying drawings.

I claim:

1. A magnetic read head comprising:
   a ferromagnetic free layer structure that has a magnetic moment that is free to rotate;
   a first pinned layer structure having a magnetic moment;
   a nonmagnetic conductive first spacer layer located between the free layer structure and the first pinned layer structure;
   an antiferromagnetic first pinning layer exchange coupled to the first pinned layer structure for pinning the magnetic moment of the first pinned layer structure; and
   the first pinned layer structure including ferromagnetic first and second pinned thin films and an iron oxide thin film with the iron oxide thin film being located between the first and second pinned thin films.

2. A magnetic read head as claimed in claim 1 wherein the iron oxide thin film is composed from the group consisting of $\gamma Fe_2O_3$, $\alpha Fe_2O_3$, $Fe_3O_4$ and FeO.

3. A magnetic read head as claimed in claim 2 wherein the first and second thin films are cobalt (Co) or cobalt iron (CoFe).

4. A magnetic read head as claimed in claim 3 wherein the first pinning layer is composed from the group consisting of platinum manganese (PtMn), iridium manganese (IrMn), iron manganese (FeMn), chromium platinum manganese (CrPtMn) and palladium platinum manganese (PdPtMn).

5. A magnetic read head as claimed in claim 4 wherein the iron oxide thin film of the first pinned layer structure is 5 Å to 20 Å thick.

6. A magnetic read head as claimed in claim 1 including:
   a second pinned layer structure having a magnetic moment;
   an antiferromagnetic second pinning layer exchange coupled to the second pinned layer structure for pinning the magnetic moment of the second pinned layer structure;
   a nonmagnetic conductive second spacer layer located between the free layer structure and the second pinned layer structure; and
   the second pinned layer structure including ferromagnetic first and second pinned thin films and an iron oxide thin film with the iron oxide thin film being located between the first and second pinned thin films.

7. A magnetic read head as claimed in claim 6 including:
   each of the first, and second pinned layer structures being first and second antiparallel (AP) pinned layer structures with each AP pinned layer structure including an AP coupling layer located between ferromagnetic first and second AP pinned layers;
   the second AP pinned layer of the first AP pinned layer structure interfacing the first spacer layer and including said first and second pinned thin films and the iron oxide thin film of the first pinned layer structure, and the second AP pinned layer of the second AP pinned layer structure interfacing the second spacer layer and including said first and second pinned thin films and the iron oxide thin film of the second pinned layer structure; and
   the first AP pinned layer of the first AP pinned layer structure being exchange coupled to the first pinning layer and the first AP pinned layer of the second AP pinned layer structure being exchange coupled to the second pinning layer.

8. A magnetic read head as claimed in claim 7 wherein the iron oxide thin film of each of the first and second pinned layer structures is selected from the group consisting of $\gamma Fe_2O_3$, $\alpha Fe_2O_3$, $Fe_3O_4$ and FeO.

9. A magnetic read head as claimed in claim 8 wherein the first and second pinned thin films of the second AP pinned layer of each of the first and second AP pinned layer structures are cobalt (Co) or cobalt iron (CoFe).

10. A magnetic read head as claimed in claim 9 wherein each of the first and second pinning layers is composed from the group consisting of platinum manganese (PtMn), iridium manganese (IrMn), iron manganese (FeMn), chromium platinum manganese (CrPtMn) and palladium platinum manganese (PdPtMn).

11. A magnetic read head as claimed in claim 10 wherein the iron oxide thin film of each of the first and second pinned layer structures is 5 Å to 20 Å thick.

12. A magnetic head assembly, including a write head and a read head, comprising:
  the write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions;
  the read head including:
    a spin valve sensor;
    nonmagnetic nonconductive first and second read gap layers;
    the spin valve sensor being located between the first and second read gap layers;
    a ferromagnetic first shield layer; and
    the first and second read gap layers being located between the first shield layer and the first pole piece layer;
  the spin valve sensor including:
    a ferromagnetic free layer structure having a magnetic moment that is free to rotate;
    a first pinned layer structure having a magnetic moment;
    a nonmagnetic conductive first spacer layer located between the free layer structure and the first pinned layer structure;
    a first antiferromagnetic pinning layer exchange coupled to the first pinned layer for pinning the magnetic moment of the first pinned layer structure; and
    the first pinned layer structure including ferromagnetic first and second pinned thin films and an iron oxide thin film with the iron oxide thin film being located between the first and second pinned thin films.

13. A magnetic head assembly as claimed in claim 12 including:
  a second pinned layer structure having a magnetic moment;
  an antiferromagnetic second pinning layer exchange coupled to the second pinned layer structure for pinning the magnetic moment of the second pinned layer structure;
  a nonmagnetic conductive second spacer layer located between the free layer structure and the second pinned layer structure; and
  the second pinned layer structure including ferromagnetic first and second pinned thin films and an iron oxide thin film with the iron oxide thin film being located between the first and second pinned thin films.

14. A magnetic head assembly as claimed in claim 13 including:
  each of the first and second pinned layer structures being first and second antiparallel (AP) pinned layer structures with each AP pinned layer structure including an AP coupling layer located between ferromagnetic first and second AP pinned layers;
  the second AP pinned layer of the first AP pinned layer structure interfacing the first spacer layer and including said first and second pinned thin films and the iron oxide thin film of the first pinned layer structure, and the second AP pinned layer of the second AP pinned layer structure interfacing the second spacer layer and including said first and second pinned thin films and the iron oxide thin film of the second pinned layer structure; and
  the first AP pinned layer of the first AP pinned layer structure being exchange coupled to the first pinning layer and the first AP pinned layer of the second AP pinned layer structure being exchange coupled to the second pinning layer.

15. A magnetic head assembly as claimed in claim 14 wherein the iron oxide thin film of each of the first and second pinned layer structures is selected from the group consisting of $\gamma Fe_2O_3$, $\alpha Fe_2O_3$, $Fe_3O_4$ and FeO.

16. A magnetic head assembly as claimed in claim 15 wherein the first and second pinned thin films of the second AP pinned layer of each of the first and second AP pinned layer structures are cobalt (Co) or cobalt iron (CoFe).

17. A magnetic head assembly as claimed in claim 16 wherein each of the first and second pinning layers is composed from the group consisting of platinum manganese (PtMn), iridium manganese (IrMn), iron manganese (FeMn), chromium platinum manganese (CrPtMn) and palladium platinum manganese (PdPtMn).

18. A magnetic head assembly as claimed in claim 17 wherein the iron oxide thin film of each of the first and second pinned layer structures is 5 Å to 20 Å thick.

19. A magnetic disk drive including at least one magnetic head assembly that has an air bearing surface (ABS) and that includes a write head and a read head, the read head including a spin valve sensor, comprising:
  the write head including:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers; and
    the first and second pole piece layers being connected at their back gap portions;
  the read head including:
    a spin valve sensor;
    nonmagnetic nonconductive first and second read gap layers;
    the spin valve sensor being located between the first and second read gap layers;
    a ferromagnetic first shield layer; and
    the first and second read gap layers being located between the first shield layer and the first pole piece layer;
  the spin valve sensor including:
    a ferromagnetic free layer structure having a magnetic moment that is free to rotate;

a first pinned layer structure having a magnetic moment;

a nonmagnetic conductive first spacer layer located between the free layer structure and the first pinned layer structure;

a first antiferromagnetic pinning layer exchange coupled to the first pinned layer for pinning the magnetic moment of the first pinned layer structure; and the first pinned layer structure including ferromagnetic first and second pinned thin films and an iron oxide thin film with the iron oxide thin film being located between the first and second pinned thin films;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

20. A magnetic disk drive as claimed in claim 19 including:

a second pinned layer structure having a magnetic moment;

an antiferromagnetic second pinning layer exchange coupled to the second pinned layer structure for pinning the magnetic moment of the second pinned layer structure;

a nonmagnetic conductive second spacer layer located between the free layer structure and the second pinned layer structure; and the second pinned layer structure including ferromagnetic first and second pinned thin films and an iron oxide thin film with the iron oxide thin film being located between the first and second pinned thin films.

21. A magnetic disk drive as claimed in claim 20 including:

each of the first and second pinned layer structures being first and second antiparallel (AP) pinned layer structures with each AP pinned layer structure including an AP coupling layer located between ferromagnetic first and second AP pinned layers;

the second AP pinned layer of the first AP pinned layer structure interfacing the first spacer layer and including said first and second pinned thin films and the iron oxide thin film of the first pinned layer structure, and the second AP pinned layer of the second AP pinned layer structure interfacing the second spacer layer and including said first and second pinned thin films and the iron oxide thin film of the second pinned layer structure; and the first AP pinned layer of the first AP pinned layer structure being exchange coupled to the first pinning layer and the first AP pinned layer of the second AP pinned layer structure being exchange coupled to the second pinning layer.

22. A magnetic disk drive as claimed in claim 21 wherein the iron oxide thin film of each of the first and second pinned layer structures is selected from the group consisting of $\gamma Fe_2O_3$, $\alpha Fe_2O_3$, $Fe_3O_4$ and FeO.

23. A magnetic disk drive as claimed in claim 22 wherein the first and second pinned thin films of the second AP pinned layer of each of the first and second AP pinned layer structures are cobalt (Co) or cobalt iron (CoFe).

24. A magnetic disk drive as claimed in claim 23 wherein each of the first and second pinning layers is composed from the group consisting of platinum manganese (PtMn), iridium manganese (IrMn), iron manganese (FeMn), chromium platinum manganese (CrPtMn) and palladium platinum manganese (PdPtMn).

25. A magnetic disk drive as claimed in claim 24 wherein the iron oxide thin film of each of the first and second pinned layer structures is 5 Å to 20 Å thick.

26. A method of making a read head comprising the steps of:

forming a ferromagnetic free layer structure having a magnetic moment that is free to rotate;

forming a first pinned layer structure having a magnetic moment;

forming a nonmagnetic conductive first spacer layer between the free layer structure and the first pinned layer structure;

forming a first antiferromagnetic pinning layer exchange coupled to the first pinned layer for pinning the magnetic moment of the first pinned layer structure; and forming the first pinned layer structure with ferromagnetic first and second pinned thin films and an iron oxide thin film with the iron oxide thin film between the first and second pinned thin films.

27. A method as claimed in claim 26 wherein the iron oxide thin film is formed from the group consisting of $\gamma Fe_2O_3$, $\alpha Fe_2O_3$, $Fe_3O_4$ and FeO.

28. A method as claimed in claim 27 wherein the first and second thin films are formed of cobalt (Co) or cobalt iron (CoFe).

29. A method as claimed in claim 28 wherein the first pinning layer is formed from the group consisting of platinum manganese (PtMn), iridium manganese (IrMn), iron manganese (FeMn), chromium platinum manganese (CrPtMn) and palladium platinum manganese (PdPtMn).

30. A method as claimed in claim 29 wherein the iron oxide thin film of the first pinned layer structure is formed 5 Å to 20 Å thick.

31. A method as claimed in claim 26 including:

forming a second pinned layer structure having a magnetic moment;

forming a second antiferromagnetic pinning layer exchange coupled to the second pinned layer structure for pinning the magnetic moment of the second pinned layer structure;

forming a nonmagnetic conductive second spacer layer between the free layer structure and the second pinned layer structure; and forming the second pinned layer structure with ferromagnetic first and second pinned thin films and an iron oxide thin film with the iron oxide thin film between the first and second pinned thin films.

32. A method as claimed in claim 31 including:

forming each of the first and second pinned layer structures with first and second antiparallel (AP) pinned layer structures with each AP pinned layer structure including an AP coupling layer between ferromagnetic first and second AP pinned layers;

forming the second AP pinned layer of the first AP pinned layer structure interfacing the first spacer layer and including said first and second pinned thin films and the iron oxide thin film of the first pinned layer structure, and forming the second AP pinned layer of the second AP pinned layer structure interfacing the second spacer layer and including said first and second pinned thin films and the iron oxide thin film of the second pinned layer structure; and forming the first AP pinned layer of the first AP pinned layer structure exchange coupled to the first pinning layer and the first AP pinned layer of the second AP pinned layer structure exchange coupled to the second pinning layer.

33. A method as claimed in claim 32 wherein the iron oxide thin film of each of the first and second pinned layer structures is selected from the group consisting of $\gamma Fe_2O_3$, $\alpha Fe_2O_3$, $Fe_3O_4$ and FeO.

34. A method as claimed in claim 33 wherein the first and second pinned thin films of the second AP pinned layer of each of the first and second AP pinned layer structures are cobalt (Co) or cobalt iron (CoFe).

35. A method as claimed in claim 34 wherein each of the first and second pinning layers is formed from the group consisting of platinum manganese (PtMn), iridium manganese (IrMn), iron manganese (FeMn), chromium platinum manganese (CrPtMn) and palladium platinum manganese (PdPtMn).

36. A method as claimed in claim 35 wherein the iron oxide thin film of each of the first and second pinned layer structures is formed 5 Å to 20 Å thick.

37. A method of making a magnetic head assembly that includes a write head and a read head, comprising the steps of:

a making of the write head including:
  forming ferromagnetic first and second pole piece layers in pole tip, yoke and back gap regions wherein the yoke region is located between the pole tip and back gap regions;
  forming a nonmagnetic nonconductive write gap layer between the first and second pole piece layers in the pole tip region;
  forming an insulation stack with at least one coil layer embedded therein between the first and second pole piece layers in the yoke region; and
  connecting the first and second pole piece layers at said back gap region;

making the read head as follows:
  forming a spin valve sensor;
  forming nonmagnetic nonconductive first and second read gap layers;
  forming the spin valve sensor between the first and second read gap layers;
  forming a ferromagnetic first shield layer; and
  forming the first and second read gap layers between the first shield layer and the first pole piece layer; and a making of the spin valve sensor including:
  forming a ferromagnetic free layer structure having a magnetic moment that is free to rotate;
  forming a first pinned layer structure having a magnetic moment;
  forming a nonmagnetic conductive first spacer layer between the free layer structure and the first pinned layer structure;
  forming a first antiferromagnetic pinning layer exchange coupled to the first pinned layer for pinning the magnetic moment of the first pinned layer structure; and
  forming the first pinned layer structure including ferromagnetic first and second pinned thin films and an iron oxide thin film with the iron oxide thin film between the first and second pinned thin films.

38. A method as claimed in claim 37 further including the steps of:
  forming a ferromagnetic second shield layer interfacing the second read gap layer; and
  forming a nonmagnetic isolation layer between the second shield layer and the first pole piece layer.

39. A method as claimed in claim 37 including:
  forming a second pinned layer structure having a magnetic moment;
  forming a second antiferromagnetic pinning layer exchange coupled to the second pinned layer structure for pinning the magnetic moment of the second pinned layer structure;
  forming a nonmagnetic conductive second spacer layer between the free layer structure and the second pinned layer structure; and
  forming the second pinned layer structure with ferromagnetic first and second pinned thin films and an iron oxide thin film with the iron oxide thin film between the first and second pinned thin films.

40. A method as claimed in claim 39 including:
  forming each of the first and second pinned layer structures with first and second antiparallel (AP) pinned layer structures with each AP pinned layer structure including an AP coupling layer between ferromagnetic first and second AP pinned layers;
  forming the second AP pinned layer of the first AP pinned layer structure interfacing the first spacer layer and including said first and second pinned thin films and the iron oxide thin film of the first pinned layer structure, and forming the second AP pinned layer of the second AP pinned layer structure interfacing the second spacer layer and including said first and second pinned thin films and the iron oxide thin film of the second pinned layer structure; and
  forming the first AP pinned layer of the first AP pinned layer structure exchange coupled to the first pinning layer and the first AP pinned layer of the second AP pinned layer structure exchange coupled to the second pinning layer.

41. A method as claimed in claim 40 wherein the iron oxide thin film of each of the first and second pinned layer structures is selected from the group consisting of $\gamma Fe_2O_3$, $\alpha Fe_2O_3$, $Fe_3O_4$ and FeO.

42. A method as claimed in claim 41 wherein the first and second pinned thin films of the second AP pinned layer of each of the first and second AP pinned layer structures are cobalt (Co) or cobalt iron (CoFe).

43. A method as claimed in claim 42 wherein each of the first and second pinning layers is formed from the, group consisting of platinum manganese (PtMn), iridium manganese (IrMn), iron manganese (FeMn), chromium platinum manganese (CrPtMn) and palladium platinum manganese (PdPtMn).

44. A method as claimed in claim 43 wherein the iron oxide thin film of each of the first and second pinned layer structures is formed 5 Å to 20 Å thick.

* * * * *